(No Model.)

H. BARRETT.
STOPPER FOR BOTTLES, JARS, AND LIKE VESSELS.

No. 281,334. Patented July 17, 1883.

Witnesses.
Chas. R. Abell
W. B. Chaffee

Inventor:
Henry Barrett
by John J. Halsted & Son
his attys.

N. PETERS. Photo-Lithographer, Washington, D. C.

UNITED STATES PATENT OFFICE.

HENRY BARRETT, OF LONDON, ENGLAND.

STOPPER FOR BOTTLES, JARS, AND LIKE VESSELS.

SPECIFICATION forming part of Letters Patent No. 281,334, dated July 17, 1883.

Application filed January 2, 1883. (No model.) Patented in England November 25, 1881, No. 5,154; in France February 23, 1882, No. 147,499, and in Italy March 31, 1883, XVI, 15,031, XXX, 39.

*To all whom it may concern:*

Be it known that I, HENRY BARRETT, a subject of the Queen of Great Britain, residing at London, England, have invented new and useful Improvements in the Manufacture of Stoppers for Bottles, Jars, and like Vessels, (for which I have obtained Letters Patent in Great Britain, No. 5,154, dated November 25, 1881, and in France, No. 147,499, dated February 23, 1882,) of which the following is a specification.

This invention relates to an improved manufacture of stoppers for bottles, jars, and like vessels, and has special reference to the manufacture of what are known as "screw-stoppers," when such stoppers are made chiefly from a heat-resisting material, such as glass; and the improvements consist in covering or coating or partly covering or coating such a screw-stopper with vulcanite, xylonite, celluloid, or like material, as hereinafter described, reference being had to the accompanying drawings.

In carrying out my invention I manufacture a combined glass (or other heat-resisting material) and vulcanite stopper by coating or partly covering the body of the screw-stopper with rubber dough ready to be converted into vulcanite, the rubber conforming to the depressions of the screw portion, and I then subject the same to treatment, usually termed "vulcanizing treatment," as usually employed in the manufacture of vulcanite.

Figure 1:
Figure 1:
Figure 2:
Figure 3:
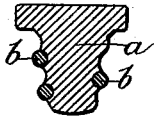

Figure 1 illustrates a screw-stopper so manufactured, and Fig. 1* a vertical section of the same. Figs. 2 and 3 show a rubber thread in the spiral or depression of the stopper-body.

When it is required to manufacture a stopper of glass or like material with a thread of vulcanite, as shown in section and elevation at Figs. 2 and 3, I cast or mold the body or stem $a$ of the stopper with a spiral groove or female thread. In this female thread I then place a cylindrical thread, $b$, of rubber dough, and I then subject the same to the treatment usually employed in manufacturing vulcanite, and thus obtain a stopper with a thread of vulcanite similar to that shown in Figs. 2 and 3 of the drawings.

Having thus described the nature of my said invention and the best means with which I am acquainted for carrying the same into effect, I would have it understood that what I claim is—

1. A screw-stopper for bottles, made of glass or other heat-resisting material, and having rubber vulcanized thereon, the rubber conforming to the depressions of the screw portion, and also forming a spiral rib.

2. A compound stopper formed of glass or like heat-resisting material, having a spiral or screw exterior, combined with a spiral thread of vulcanized rubber, substantially as hereinbefore described.

H. BARRETT.

Witnesses:
 G. F. REDFERN,
 A. ALBUTT.